Figure 1:
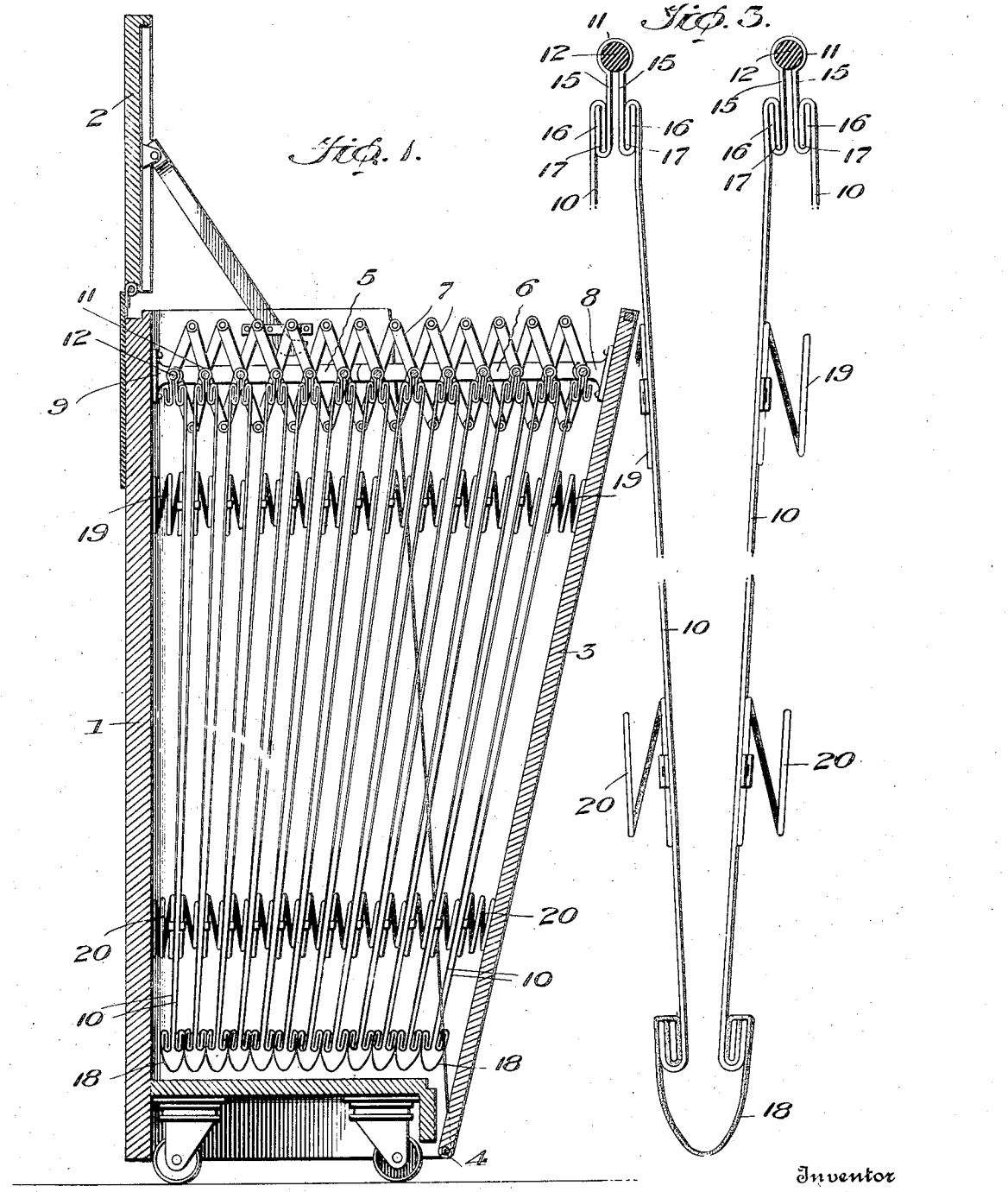

C. B. ULRICH.
FILE.
APPLICATION FILED DEC. 22, 1914.

1,126,923.

Patented Feb. 2, 1915.

4 SHEETS—SHEET 2.

Witnesses
A. A. Ege

Inventor
Charles B. Ulrich.
By
his Attorneys

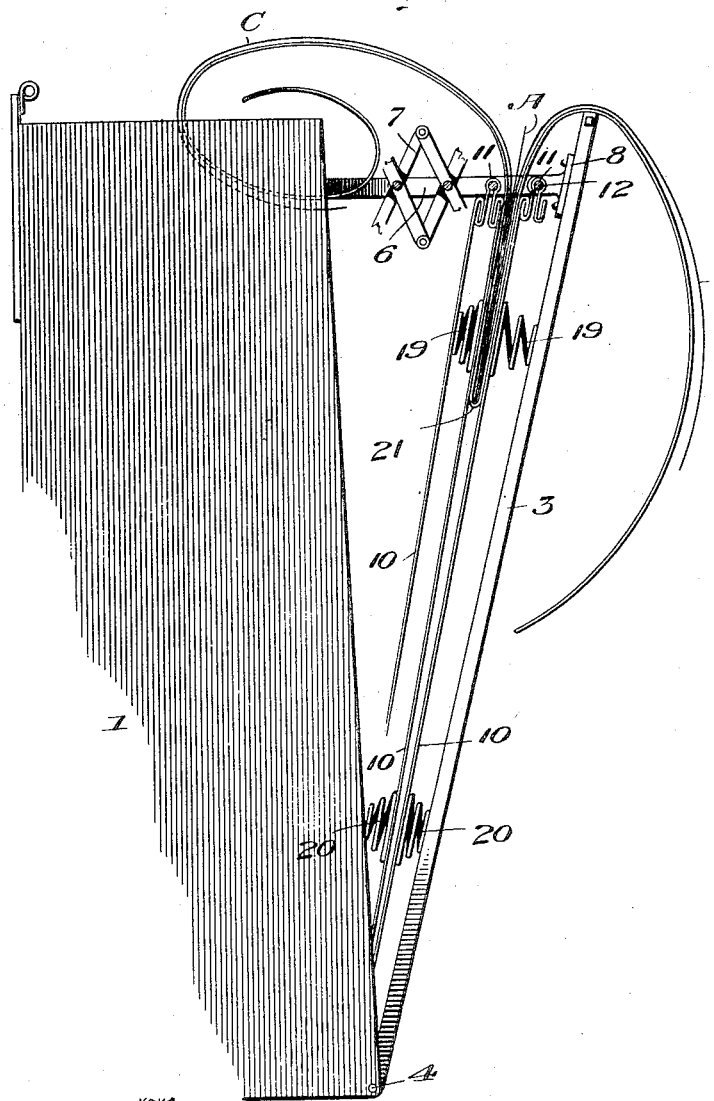
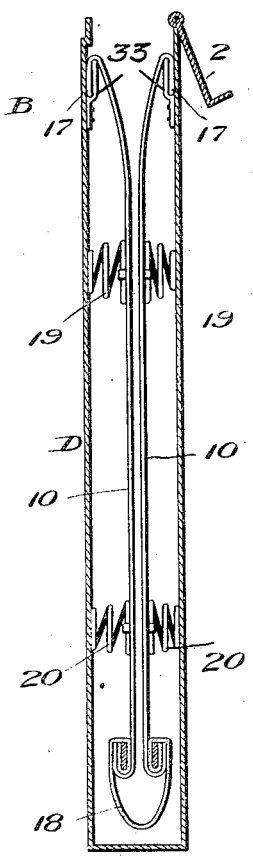
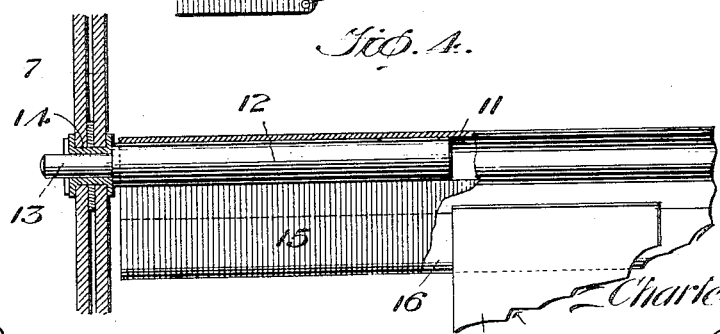

C. B. ULRICH.
FILE.
APPLICATION FILED DEC. 22, 1914.
1,126,923.
Patented Feb. 2, 1915.
4 SHEETS—SHEET 4.
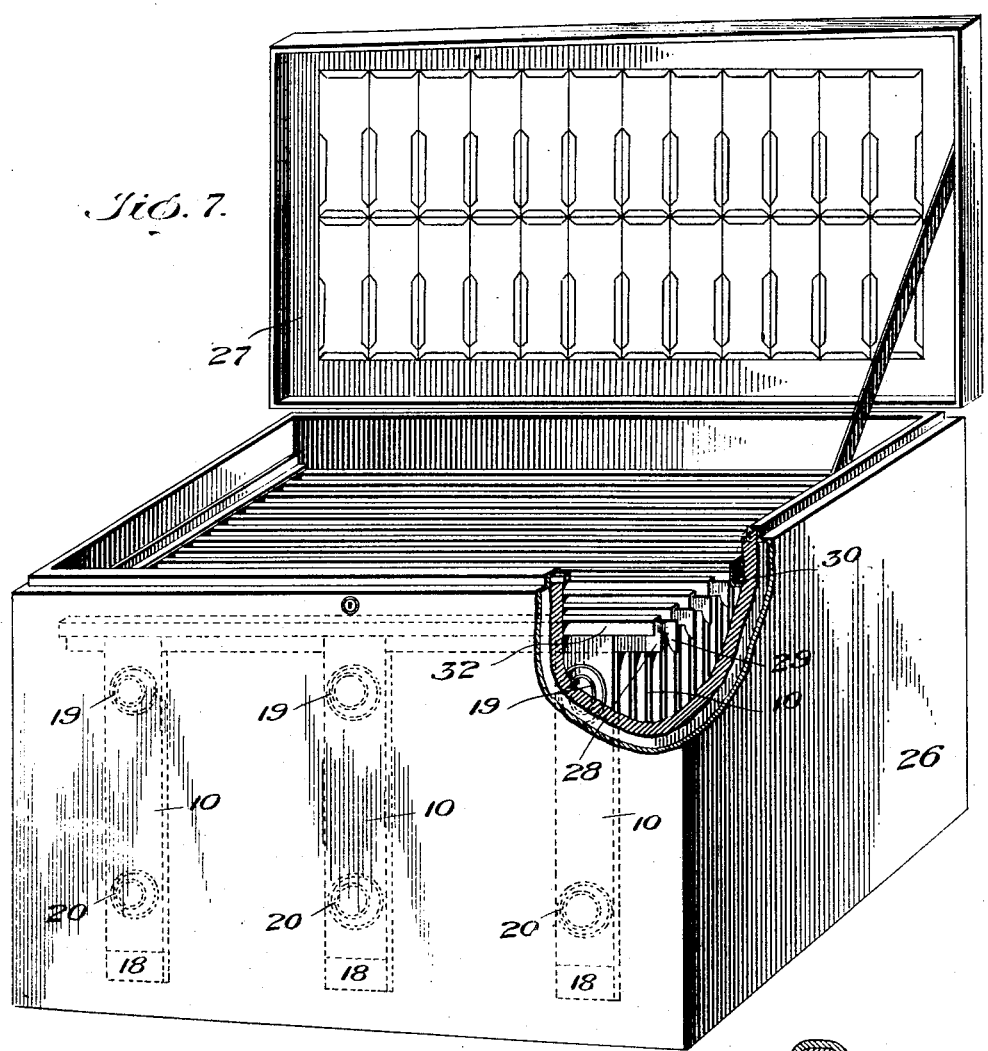
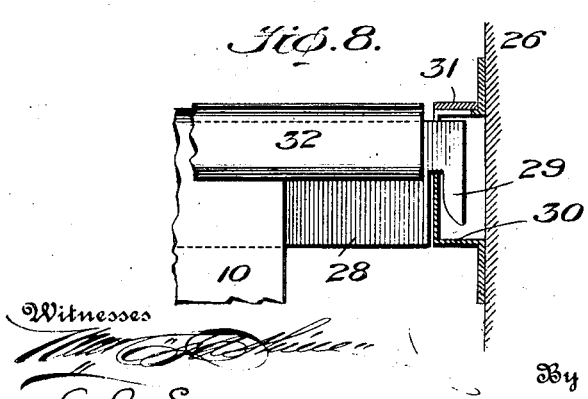
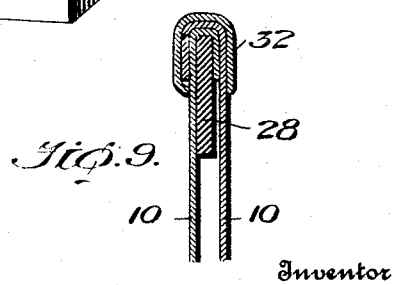
Inventor
Charles B. Ulrich

UNITED STATES PATENT OFFICE.

CHARLES B. ULRICH, OF HOUGHTON, MICHIGAN.

FILE.

1,126,923.

Specification of Letters Patent.

Patented Feb. 2, 1915.

Application filed December 22, 1914. Serial No. 878,549.

*To all whom it may concern:*

Be it known that I, CHARLES B. ULRICH, a citizen of the United States, residing at Houghton, in the county of Houghton and State of Michigan, have invented certain new and useful Improvements in Files, of which the following is a specification.

This invention relates to files and has for its object to provide for filing large thin sheets, such for instance as tracings, blue prints and the like, in a vertical position, and also to provide for the convenient introduction and removal of individual sheets from any portion of the file.
It is also designed to maintain the sheets in a flat and smooth condition so as to avoid wrinkling and creasing thereof.

A still further object of the invention is to provide for effectually holding the bottom portions of a plurality of sheets within the upper portion of a pocket, when the sheets have been partially withdrawn from the pocket, and thereby to permit of the selection and withdrawal of any one of the sheets without necessitating the withdrawal of the other sheets.

With these and other objects in view, the present invention consists in the combination and arrangement of parts, as will be hereinafter more fully described, shown in the drawings, and particularly set forth in the appended claims, it being understood that changes in the form, proportion, size and minor details may be made, within the scope of the claims, without departing from the spirit or sacrificing any of the advantages of the invention.

Figure 2:
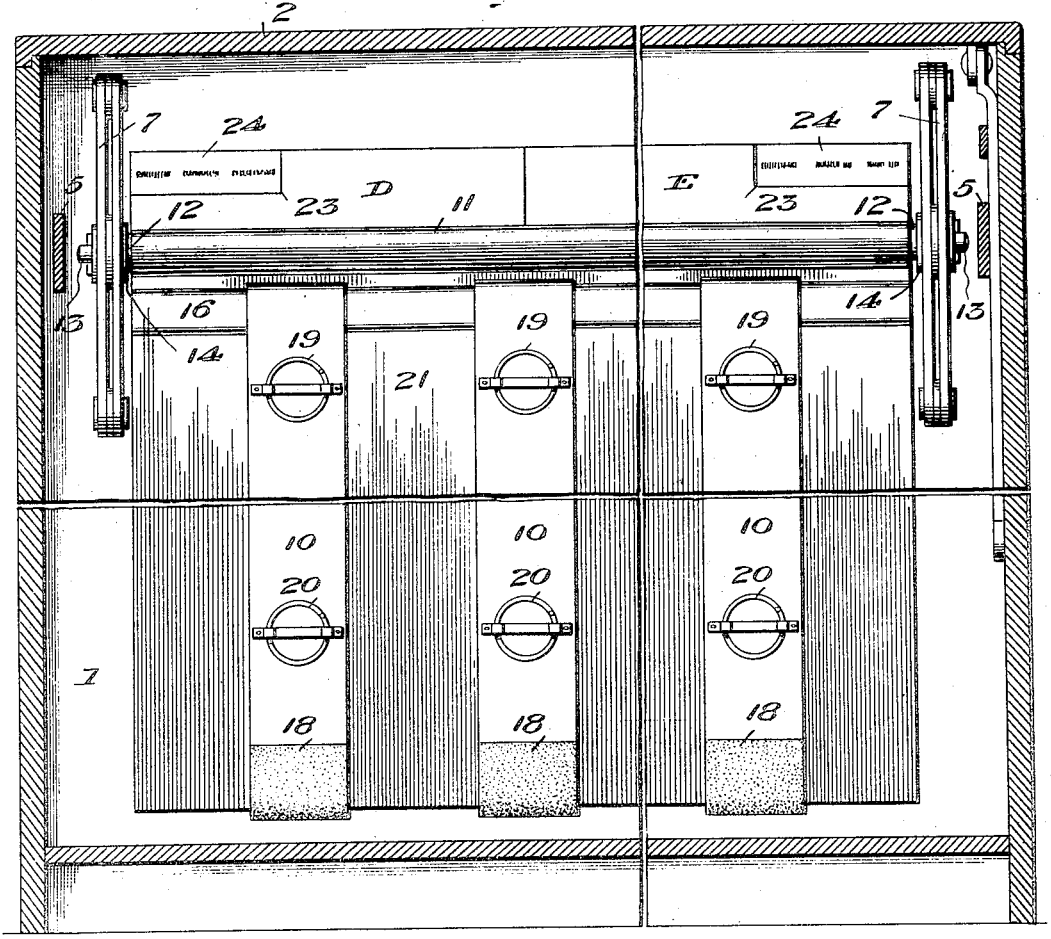
Figure 6:
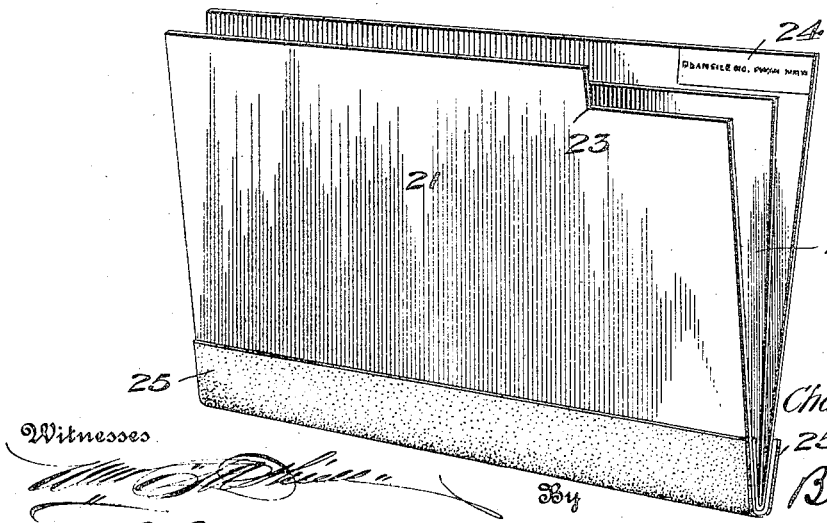

In the drawings, Figure 1 is a vertical longitudinal sectional view of a file embodying the features of the present invention. Fig. 2 is a cross-sectional view on an enlarged scale, showing one of the filing pockets in elevation. Fig. 3 is an enlarged end view of one of the pockets. Fig. 4 is an enlarged detail sectional view through one end of one of the pocket-supporting devices. Fig. 5 is an end elevation with one of the folders drawn partially out of a pocket and opened to give access to the sheets in the folder. Fig. 6 is a detail perspective view of one of the folders of the present invention. Fig. 7 is a perspective view of another embodiment of the invention, one corner of the case or cabinet being broken away to show some of the pockets. Fig. 8 is an enlarged fragmentary detail sectional view showing the manner of supporting a pocket on one of the walls of the case or cabinet. Fig. 9 is a cross-sectional view of Fig. 8. Fig. 10 is a vertical longitudinal sectional view of a file embodying the features of the present invention and including one pocket only.

Like parts on the drawing are designated by corresponding reference characters.

Referring at first more particularly to Figs. 1 to 6, inclusive, 1 designates a suitable case or cabinet provided with a hinged top 2 and a front 3, which is hinged or pivoted at its lower edge, as indicated at 4, and is connected at each end at the top thereof with the back of the case or cabinet by a pair of pivotally connected links 5 and 6, the pivotal connection of which is adapted to break downwardly when the front of the case or cabinet is swung inwardly into its closed position.

Within the cabinet, at the top and at each end thereof, there is a lazy tong device 7, the front end of which is pivotally connected to the front of the casing or cabinet by a bracket 8, and its rear end connected to the back of the cabinet by a bracket 9. Suspended from and between the two lazy tong devices is a series of file pockets, and as these pockets are duplicates in construction and arrangement, a description of a single pocket will be sufficient. Each pocket is of skeleton formation, and is open throughout its top and opposite ends. Each side of each pocket is made up of a plurality of upright members 10 spaced at regular intervals and preferably formed of sheet metal. While any number of these side strips or members may be employed, three such members have been shown in Fig. 2 of the drawings. These side members are hung from their upper ends on supporting means which are, in turn, supported by the lazy tong devices at opposite ends of the file. This supporting means includes a substantially tubular cross-bar 11, in each end portion of which is a spindle 12, which projects through the end of the cross-bar and is provided with a reduced terminal stud or pintle 13 which is received in the adjacent tubular pivot 14 of the lazy tong device. The tubular cross-bar 11 is formed of a single sheet of metal bent into substantially tubular form with its edge portions 15 extending downwardly from the tubular portion to form side members, the extremities 16 of which are folded upwardly on the outer faces of the respective side members so as to form hooked flanges, with which the upper hooked ends 17 of the side members 10 are engaged. These interhooked portions are suitably connected, say for instance, by being spot-welded so as to hold the side members 10 in their proper spaced relation. The lower ends of each pair of pocket side members 10 are connected by a depending loop 18 of some flexible material, the ends of which are suitably connected to the members 10.

The pocket construction thus described is of skeleton formation having spaced smooth upright side members arranged in pairs, each pair being connected at the bottom by a flexible loop. The smooth metal side members facilitate the introduction and removal of sheets, while the flexible loops tend to draw together the sides of the pocket under the weight of the contents thereof, thereby centering the contents and preventing collapsing or bulging thereof, as will be hereinafter explained.

By reference to Figs. 1 and 3 of the drawings, it will be noted that one side of each pocket is suspended from one cross-bar or supporting member, while the opposite side of the pocket is connected to the next adjacent cross-bar or supporting member, whereby the open top of the pocket is conveniently accessible through the unobstructed space between adjacent cross-bars.

In the embodiment shown in Figs. 1, 2 and 5 of the drawings, the cross-bars or supporting members are supported upon the pivotal connections of the lazy tong devices, and consequently said cross-bars are separated when the front 3 of the cabinet is opened, and are moved toward one another when said front is closed, whereby the sides of the pockets are drawn apart when the front of the case or cabinet is opened, and are forced toward one another when the front of the cabinet is closed.

Between adjacent pockets there is an upper transverse series of springs 19 and a similar lower series of springs 20. One end of each spring is connected to the exterior of one of the pockets and its opposite end is connected to the exterior of the adjacent pocket. Each series of springs is located along a transverse line where the contents of the pocket has a tendency to bulge, buckle or break down, and therefore these series of springs provide a compression on the sides of the pocket at the most advantageous places for preventing buckling of the contents of the pocket and thereby maintain said contents in a smooth and upright condition. Helical springs are preferred, as the coils thereof nest in one another and thus permit of the pockets being forced into close relation.

For each pocket, there is provided a folder 21, such for instance, as is shown in Figs. 6, 2 and 5. Folders have been omitted from Fig. 1 as their presence would obscure the construction shown therein. This folder is of relatively heavy material, and is either a single piece of material folded midway between its ends, or it may be made up of two pieces of material suitably connected along their lower edges. If desired, the folder may have one or more partitions 22 dividing the folder into a plurality of compartments. The sides of the folder are of the same height so as to bring their upper edges in the same horizontal plane. One corner of the front of each folder is notched or cut away, as at 23, so as to expose an index portion 24 on the rear side member of the folder. For purposes of strength and durability, the bottom edge of the folder may be bound with a piece of tape, as shown at 25. There is provided one such folder for each pocket, the vertical dimension of the folder exceeding that of the pocket, as clearly shown in Fig. 2 of the drawings, in order that the folder may extend above the top of the pocket into position for convenient access. The tracings, blue prints or other sheets to be filed away are placed in the folder in a flat condition, and then the folder is thrust downwardly through the open top of a pocket into the position shown in Fig. 2, in which position it is held in an upright position and the contents thereof is maintained in a smooth vertical condition by reason of the compression afforded by the compression springs. Moreover, the flexible loops 18, constituting the bottom of the pocket, sag down under the weight of the folder and its contents, and thereby apply pressure to opposite sides of the bottom portion of the folder so as to prevent the latter from buckling or bulging below the lower series of compression springs 20.

When it is desired to have access to a tracing, blue print or other sheet in one of the pockets, the case or cabinet is opened, as in Figs. 1 and 5, and the desired folder is grasped by its upper edges and pulled upwardly until the bottom portion of the folder is gripped between the upper series of compression springs, whereupon the sides of the folder are spread apart, and the desired tracing or the like selected, drawn out of the folder and spread across the top of the device. During this manipulation, the folder and its contents are securely held in position by the upper series of compression springs and need no attention from the user of the device. After the sheet has been examined, it may be conveniently returned to its place by permitting a portion of the sheets to fold over toward the back of the case and the remaining portions to fold over toward the front of the case, and then the removed sheet may be placed flatwise upon the front sheets with both hands on top thereof and then moved edgewise down between the sheets until its lower edge is stopped by the bottom of the folder, whereupon the folder may be folded up and thrust downwardly into the pocket until stopped by the bottom thereof.

It will, of course, be understood that the compression springs are arranged to apply sufficient pressure to maintain even a single sheet in a smooth upright condition, and so the device is adapted for either a few sheets or many sheets up to the capacity of the pockets.

While a plurality of pockets have been shown in Fig. 1 of the drawings, it will, of course, be understood that each pocket is complete in itself and may be used singly or in series, as may be desired.

The folder is open throughout its ends in order that the front and back thereof may be opened up and folded back as hereinbefore described and shown in Fig. 5 of the drawings, to give convenient access to the contents of the folder, and to permit the ready introduction of sheets.

It is not necessary that all of the sheets be of the same vertical dimension, as a small sheet may be thrust down into the bottom of the folder and be gripped between the lower series of springs, and upon drawing the folder up into the position shown in Fig. 5, the short sheet A will be brought up into an accessible position, when the other sheets B and C have been separated and folded front and back, respectively.

An important advantage is obtained in having both sides of the folder of the same length, and the front of the folder cut away to disclose the index on the back of the folder, in that as each index is carried by the back of its folder, the user of the device will have a definite guide to each folder, and can thereby avoid taking hold of one side of one folder and the other side of an adjacent folder and consequently pulling out two folders.

To increase the classification of tracings, blue prints or the like, half length folders, such as shown at D and E in Fig. 2 of the drawings, may be employed, each folder, of course, being cut away at the front to expose the index on the rear side of the folder.

The embodiment of this invention in Figs. 1 to 6, inclusive, is that of the expansible type, but it will, of course, be understood that the invention is not limited to the expansion type, as will be readily understood by reference to Figs. 7, 8 and 9. In Fig. 7, 26 is a case or cabinet in the form of a rectangular box having a suitable hinged cover 27 and containing pockets embodying the features of the present invention, as hereinbefore described and particularly illustrated in Figs. 3 and 5, the difference being merely in the manner of supporting the pockets. Instead of a substantially tubular cross-bar 11, there is provided a flat cross-bar 28, notched at each end to provide a hook 29 which is received within a suitable seat or notch formed in a hollow ledge 30 provided upon the inner wall of one end of the box or cabinet. A suitable cap strip 31 is secured upon the top of the hollow edge so as to close the tops of the notches or openings and thus prevent accidental and intentional removal of the cross-bars. The side members 10, which constitute one side of a pocket, are bent over the top of an adjacent cross-bar 28, while the adjacent side members of the next pocket are bent over the same cross-bar, there being a substantially U-shaped cap strip 32 secured over the bent-over portions of the members 10, so as to cover them up and give a proper finish to the pockets. In this construction, there is no lateral movement of the cross-bars for the purpose of expansion, but it, of course, will be understood that the compression springs 19 and 20 are employed in exactly the same relation as shown in Figs. 1, 2, 3 and 5.

As clearly shown in Fig. 1, there is a series of springs between the front of the case or cabinet and the adjacent side of the front pocket, and likewise there is a series of springs between the back of the case or cabinet and the rear pocket, such an arrangement, of course, being true in the embodiment shown in Fig. 7.

While there is a greater compression upon the contents of the file in the expansible form shown in Figs. 1, 2 and 5, yet it will be understood that the compression due to the closing of the hinged front of the cabinet is not essential to the proper maintenance of the sheets in the pockets, as this is accomplished through the medium of the compression springs, both in the expansible form of the device and the non-expansible form thereof.

While folders have not been shown in Fig. 7, because they would merely confuse the construction, it is, of course, to be understood that folders are employed in this embodiment of the invention in order that tracings and the like may be conveniently drawn out of the pockets and opened up for inspection in precisely the same manner as described in connection with Fig. 5 of the drawings.

In each embodiment of the invention, it will be noted that the pocket is suspended wholly from its upper end and hangs freely therefrom except for the compression of the springs, and the bottom of the pocket terminates short of the bottom of the case or cabinet and is entirely free and unsupported in order that the bottom edge of the folder may be centered as hereinbefore described.

By reason of the skeleton formation of the pocket, no air is trapped therein when the folder is forced down into the pocket, which is, of course, a very important feature of this invention. Moreover, the metallic side members 10 are smooth and relatively stiff as compared with the flexible bottoms of the pocket, whereby said smooth metal sides facilitate the introduction of the folder into the pocket.

For some purposes, such for instance as holding tracings, drawings or the like at an end or the back of a drawing board, a single pocket is sufficient, and for such use, the file may be constructed to include one pocket only, as shown in Fig. 10 of the drawings, wherein the pocket construction is exactly the same as hereinbefore described, except for a slight change in the manner of suspending the pocket. In this arrangement, the case or cabinet D is of a size to accommodate a single pocket with its springs 19 and 20 bearing against the front and back, respectively, of the case. The top of the case, of course, is open and is provided with a hinged cover 2 of any suitable or preferred construction. The casing may be fastened at its upper end to the back or end of a drawing board, table or the like in any suitable manner. The top of each side of the pocket may be connected to the adjacent wall of the case or cabinet in any preferred way, say, for instance, by having the metallic side pieces bent over into hooked engagement with the upstanding clips 33 carried by the respective walls of the case or cabinet. Of course, a single folder, such as shown in Fig. 6, is employed with the single pocket form of the file.

Having thus described the invention, what I claim is:—

1. A file having an upright pocket open at its upper end, a folder carried in the pocket and open at its top and ends, and compression means along the upper portion of the pocket to hold the bottom portion of the folder within the pocket when drawn up opposite the compression means.

2. A file having an upright pocket open at its upper end, a folder carried in the pocket and open at its top and ends, and compression means along the upper portion of the pocket to hold the bottom portion of the folder within the pocket when drawn up opposite the compression means, said compression means including springs bearing against the exteriors of the opposite sides of the pocket.

3. A file having an upright pocket open at its upper end and also suspended from its top, the bottom of the pocket being a flexible loop free and unsupported, and the sides of the pocket above the flexible bottom being stiff and constituting guides.

4. A file having an upright pocket open at its upper end and also suspended from its top, said pocket being of skeleton formation and having stiff upright side members, and flexible loops connecting the bottoms of corresponding side members and constituting the bottom of the pocket.

5. A file having an upright pocket open at its upper end and also suspended from its top, said pocket being of skeleton formation and having stiff upright side members, flexible loops connecting the bottoms of corresponding side members and constituting the bottom of the pocket, and compression springs bearing against the stiff side members of the pocket.

6. A file comprising a cabinet having an open top, a series of cross-bars within the upper portion of the cabinet, a series of pockets suspended from the cross-bars and provided with flexible bottoms disposed above the bottom of the cabinet, each pocket having one side suspended from one cross-bar and the opposite side suspended from an adjacent cross-bar, folders in the pockets and open at their tops and ends, and compression means along the upper portions of the pockets to hold the bottom portions of folders within the pockets when drawn up opposite the compression means.

7. A file having an upright pocket open at its upper end, compression means along the upper portion of the pocket tending to force the sides thereof together, and a folder contained within the pocket and of a height to project through the open top of the pocket, the upper edges of the opposite sides of the folder being in substantially the same horizontal plane, there being a notch or opening in the upper portion of the front of the holder, and an index carried by the front side of the back of the holder in alinement with the notch or opening in the front side of the holder.

8. A folder for vertical filing purposes, comprising a front and back connected along the lower edges only, the top and ends of the folder being open, and the top edges of the front and back of the folder being in substantially the same horizontal plane, the upper portion of the front of the folder having a notch or opening, and the front face of the back of the folder having an index in alinement with said notch or opening.

9. A folder for vertical filing purposes having a front and a back connected along their lower edges only, the folder being open throughout its top and ends, the upper portion of the front of the folder having a notch or opening, an index upon the front face of the back of the folder in alinement with the notch or opening, and a partition rising from the bottom of the folder and having a portion terminating short of the index.

In testimony whereof I affix my signature in presence of two witnesses.

CHARLES B. ULRICH.

Witnesses:
H. S. SHEPARD,
W. M. HART.